Dec. 12, 1961 H. I. GLASER 3,013,096
METHOD AND APPARATUS FOR MELTING AND
FEEDING HEAT-SOFTENABLE MATERIALS
Filed Dec. 30, 1957 3 Sheets-Sheet 2
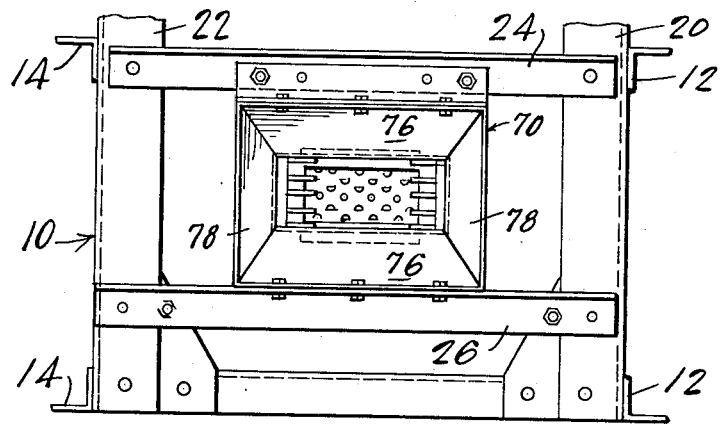
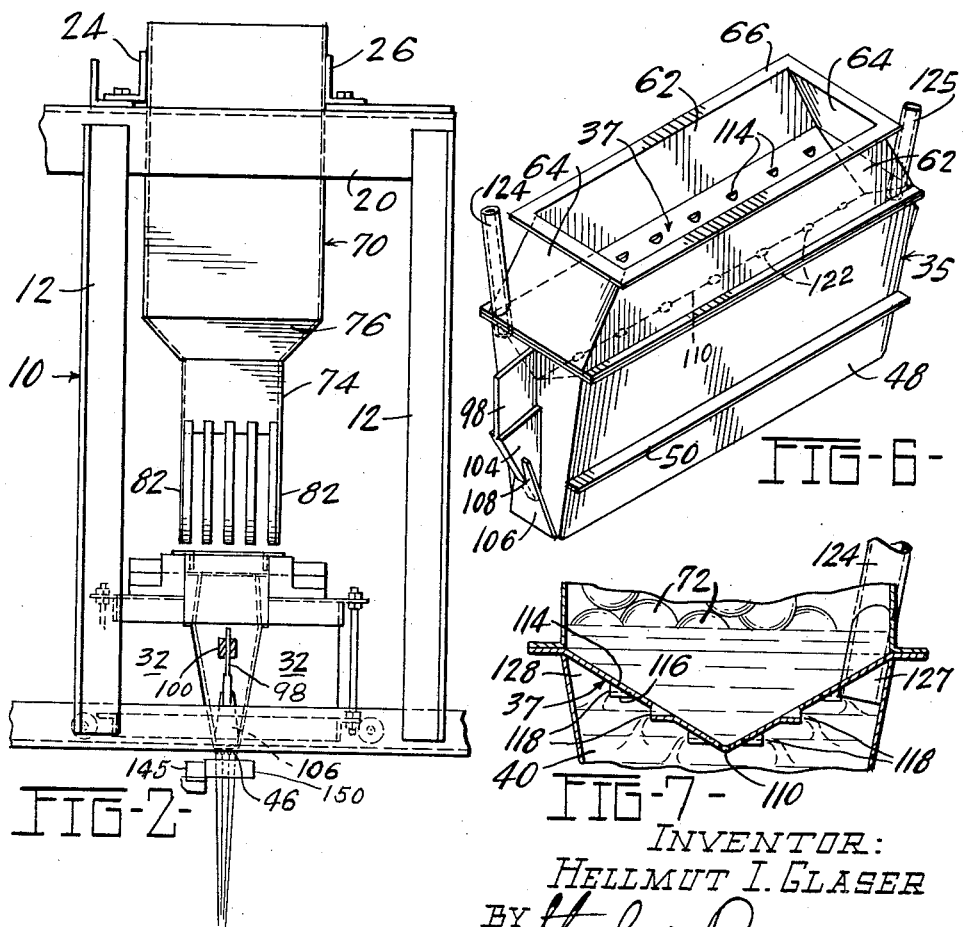
INVENTOR:
HELLMUT I. GLASER
BY
ATT'YS.

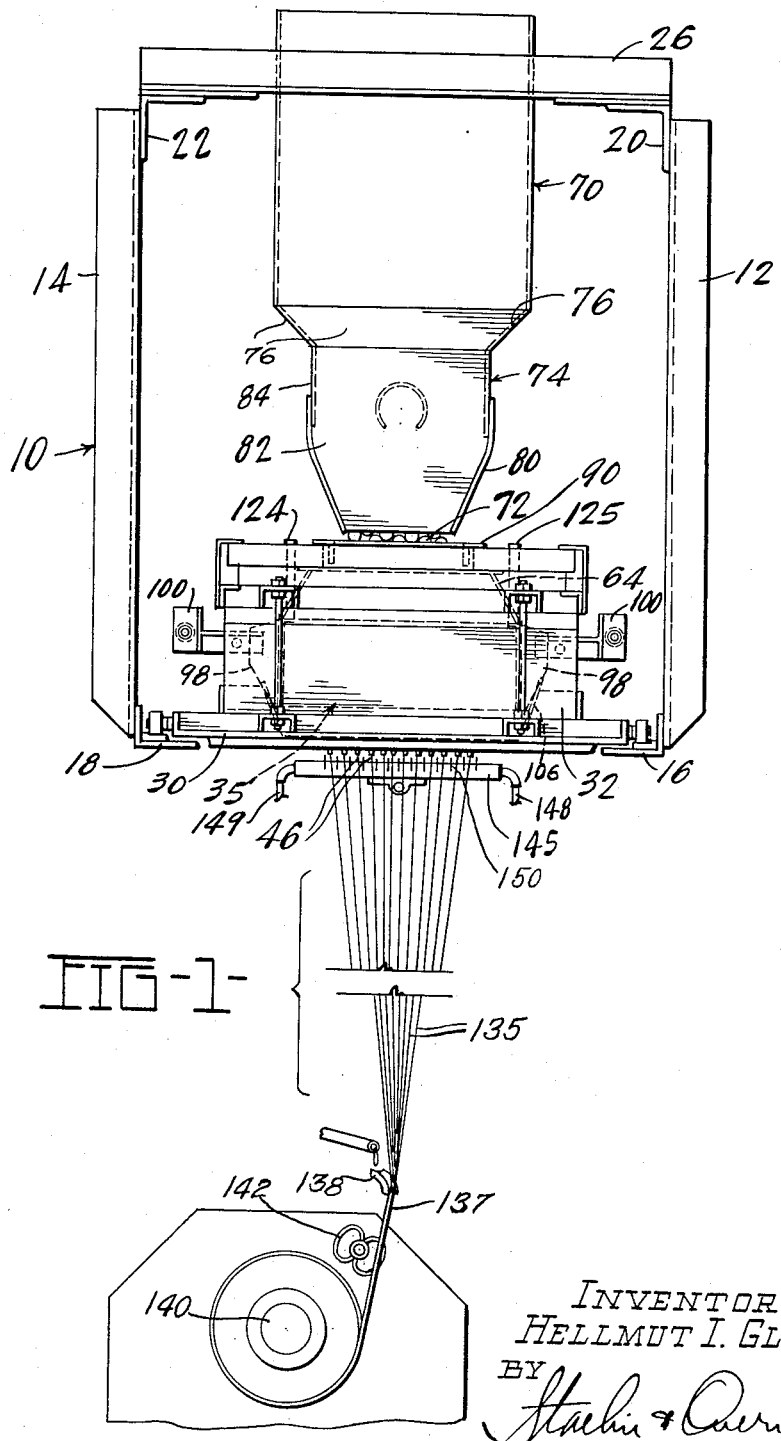

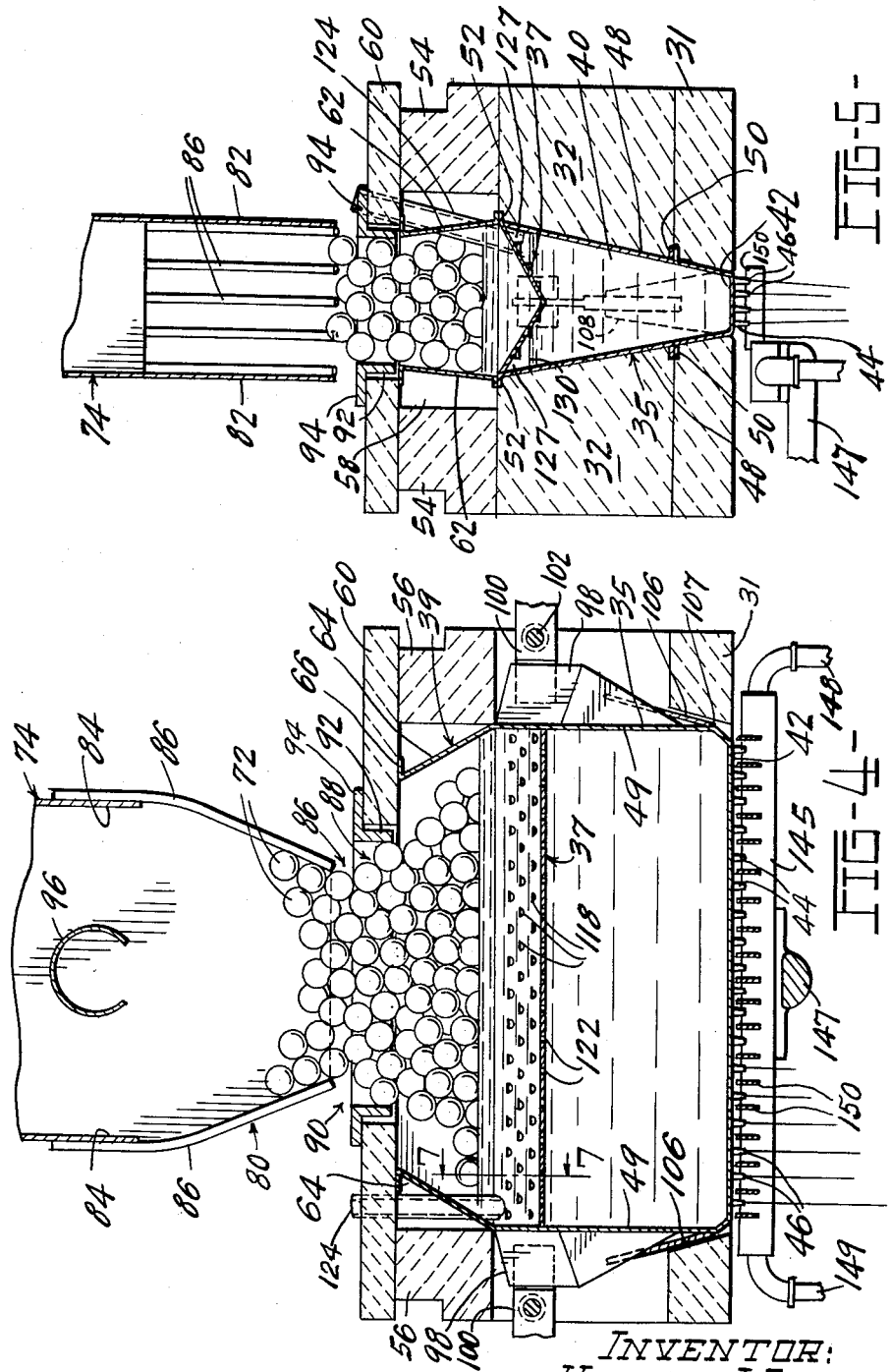

United States Patent Office 3,013,096
Patented Dec. 12, 1961

3,013,096
METHOD AND APPARATUS FOR MELTING AND FEEDING HEAT-SOFTENABLE MATERIALS
Hellmut I. Glaser, Anderson, S.C., assignor to Owens-Corning Fiberglas Corporation, a corporation of Delaware
Filed Dec. 30, 1957, Ser. No. 706,060
11 Claims. (Cl. 13—6)

This invention relates to a method of and apparatus for melting heat-softenable materials and for delivering or feeding streams of the material and more particularly to an arrangement for preheating and melting heat-softenable mineral materials such as glass and flowing streams of the conditioned or molten material which may be mechanically attenuated to linear bodies, filaments or fibers especially usable in forming strands or yarns for textile uses.

In the fabrication of textiles formed of strands, yarns or threads of glass fibers or filaments, the fibers or filaments must be of substantially the same size and character in order that commercially acceptable textiles may be produced. The glass or other mineral material employed in forming filaments for textile uses must be highly refined and of homogeneous character. In order to attain high quality glass usable for such purposes, the glass batch is melted in a comparatively large furnace and the glass refined until it is substantially free of seeds, cords, stria and impurities which would impair the quality of the glass. The refined glass from the melting furnace is then fashioned or molded into pieces or bodies preferably in the shape of small spheres or marbles which are subsequently resoftened for forming textile filaments.

It has heretofore been conventional practice to deliver the marbles directly into a feeder or bushing which is supplied with electrical energy to remelt or soften the spheres or marbles to a flowable state and the softened glass discharged through orifices in a bottom wall or floor of the feeder and the discharged streams attenuated to filaments by mechanical means.

In such arrangements, the marbles are delivered individually and periodically by mechanical gating or metering means through a suitable chute accommodating a single row of marbles into the electrically heated feeder in which the marbles are reduced to molten or flowable condition. The molten glass in the feeder may be of a temperature of upwards of 2300° F. or more while the marbles introduced into the feeder are relatively cold, being substantially at room temperature. A major difficulty in forming filaments by attenuating streams of glass is the maintenance of the glass streams at a substantially constant viscosity.

A deviation or differential of a few degrees in the temperature of the glass in the feeder changes or modifies its viscosity which results in variations in the size or character of the attenuated filaments. As each relatively cold marble or piece of glass is fed or delivered into a feeder, it causes a rapid temperature change or thermal shock in the molten material in the feeder effecting a sufficient change in the viscosity to temporarily modify the size of the filaments formed from the streams of glass.

Such thermal shock presents a particularly difficult problem where a large number of streams of glass are continuously flowed from a single feeder necessitating successive delivery of individual marbles at comparatively short intervals a condition which causes continuous fluctuation in the viscosity of the molten glass from which the streams are formed.

The present invention embraces a method for reducing heat-softenable mineral material such as glass to a flowable condition and maintaining the material at a required condition of flowability in a feeder zone during delivery of solid pieces or bodies of glass or other mineral material into a melting zone without transmitting thermal shock to or materially modifying the viscosity of the conditioned material in the feeder zone.

The invention has for an object the provision of a method involving the steps of delivering preheated solid bodies or pieces of heat-softenable mineral material such as glass into a zone in which the preheated bodies are reduced to a molten or flowable state and the molten material caused to flow through perforations or passages in a partition into a feeder zone from which the material is delivered for further processing and wherein electric current flows through the partition to effect heating of the mineral material or glass in both the melter zone and the feeder zone.

Another object of the invention embraces a method of applying or flowing electric current through a partitioned chamber providing a melting zone and a feeding zone and wherein the heat generated by the flow of electric current is transferred to the material in said zones in a manner to establish a substantially constant head of the molten material in the feeder zone without the use of level controls, and the material in the melting zone flowed into the feeder zone for continuously replenishing the supply in the feeder zone substantially at the rate of withdrawal of material from the feeder zone.

Another object of the invention is the provision of a method of reducing bodies or pieces of mineral material to a molten state in a chamber containing the molten material without imparting thermal shock to the region of the chamber from which the mineral material is withdrawn in a plurality of streams, the method including applying electric current to the chamber in a manner to maintain the material at the discharge region of the chamber at a substantially constant viscosity.

Another object of the invention embraces a method of melting pieces of heat-softenable mineral material in a chamber by flowing electric current through a perforated metallic member or screen extending across the chamber to melt mineral material above the screen and heat the same to a viscosity at which it flows through the perforations to a feeder zone beneath the screen from which the molten material is continuously withdrawn, in which zone the material contacts only a portion of the surface of the screen thereby setting up a differential in heat transfer to the material above and below the screen whereby a substantially constant level of the molten mineral material is maintained automatically below the screen irrespective of substantial variations in the rate of withdrawal of molten mineral material from the feeder zone.

Another object of the invention resides in a method of reducing pieces of glass to a molten state in one zone, flowing molten material from the said zone to a second zone from which the molten material is continuously withdrawn, establishing a perforated partition across the chamber defining the zones, and flowing electric current through the partition for melting the pieces of glass above the partition and establishing temperature differentials of the molten glass at opposite sides of the partition whereby the molten glass below the partition is maintained at a lower level than the molten glass above the partition.

Another object of the invention embraces a method of melting pieces of glass and conditioning the viscosity of molten glass wherein two different levels of molten glass are concurrently maintained in a chamber and wherein gases or volatiles emanating from the glass at the lower level are vented at regions independently of the glass at the higher level.

Another object of the invention resides in a method of melting pieces of glass or other mineral material and conditioning the molten glass in a chamber wherein the melting of the glass is accomplished by flowing an electrical current across a central region of the chamber for melting pieces of glass in the chamber at the upper zone thereof and shunting some of the electric current through the base of the chamber containing orifices through which the molten glass is delivered whereby to decrease the viscosity of the glass adjacent the orifices.

Still another object of the invention is the provision of a glass receiving chamber provided with a V-shaped partition separating the chamber into a melting zone and a feeder zone, the arrangement including means for directing an electric current through the partition to generate heat for melting the glass in one zone, the region of application of the electric current to the chamber being adjustable to exercise control over the viscosity of the molten glass adjacent the partition to establish different levels of molten glass at the opposite sides of the partition whereby to establish and maintain a predetermined level of molten glass in the feeder zone of the chamber.

Still a further object of the invention is the provision of a melting and conditioning chamber for glass provided with a perforated partition extending across the chamber wherein the material of the regions of the partition is struck outwardly to form openings in the partition, the struck up portions being disposed to provide a path of least resistance to current flow to obtain substantially uniform heating of the glass throughout the entire area of the partition.

A further object of the invention is the provision of a combined glass melting and glass feeding chamber in which the floor of the feeding chamber is provided with a plurality of orifices for the discharge of streams of molten glass and wherein a perforated V-shaped strip extends across the chamber with means for flowing current through the strip to heat the glass above and below the strip in a manner to control the viscosity of the material adjacent the partition and hence the rate of transfer of the molten material from one side of the partition to the other in order to thereby control the rate of reduction of solid pieces of glass to molten condition in the melting region of the chamber and stabilize the glass level in the feeder region.

purity ions which are derieved both from the plasma

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a front elevational view of an apparatus embodying the invention particularly usable for performing the method of melting and conditioning heat-softenable mineral material for subsequent processing;

FIGURE 2 is a side elevational view of the structure shown in FIGURE 1;

FIGURE 3 is a top plan view of the apparatus shown in FIGURES 1 and 2;

FIGURE 4 is a longitudinal vertical sectional view showing the material supply means, the material melting region, and a feeder region for delivering streams of the material;

FIGURE 5 is a transverse sectional view taken substantially on the line 5—5 of FIGURE 4;

FIGURE 6 is an isometric view of the material melting and conditioning chamber or receptacle, and FIGURE 7 is an enlarged detail sectional view taken substantially on the line 7—7 of FIGURE 4.

While the method and apparatus of the invention have particular utility in melting and conditioning glass for the formation of fine filaments or fibers, it is to be understood that the method and apparatus of the invention may be utilized for melting and conditioning other mineral materials for various purposes.

Referring to the drawings in detail and initially to FIGURES 1, 2 and 3, a form of apparatus is illustrated which is particularly adaptable for carrying out or performing the method of the invention.

The apparatus is inclusive of a suitable frame structure 10 which may be mounted upon structural members (not shown) of a building or room in which the apparatus is installed. The frame 10 includes pairs of vertically disposed struts or beams 12 and 14 which are connected at their lower ends with horizontally disposed beams 16 and 18. The upper ends of the struts 12 and 14 are joined to horizontal beams 20 and 22 and the latter secured to longitudinally extending beams 24 and 26.

The frame 10 provides supporting means for a receptacle or means 35 forming a melting chamber or zone and a feeding chamber or zone, and a hopper adapted to contain a supply of pieces or bodies of heat-softenable mineral material such as glass preferably in the form of spheres or marbles. Supported by the frame members 16 and 18 is a supplemental frame including a member 30 upon which is mounted a plate 31 of refractory which supports members or blocks 32 formed of refractory.

The members 32 are spaced to accommodate the receptacle 35 which is formed of high temperature resistant metal or alloy such as platinum rhodium or other suitable material capable of withstanding high temperatures required in melting and conditioning glass or other mineral material. The member or receptacle 35 is of the configuration or shape illustrated in FIGURES 4, 5 and 6 which is partitioned by means of a member or strip 37 extending across the receptacle 35 to provide a material melting region or zone 39 above the partition and a feeder zone or region 40 below the partition, the latter containing molten glass received from the melting zone 39.

The floor or lower wall 42 of the member or receptacle 35 is formed with a plurality of projections or tips 44 provided with orifices or openings through which the molten material in the feeder region 40 is discharged in a plurality of streams 46. As particularly shown in FIGURES 5 and 6, the side walls 48 of the member 35 defining the feeder zone of the chamber are disposed in generally converging relation and are joined at their lower ends with the horizontal floor 42. The plate 31 is formed with a rectangularly-shaped opening to accommodate the member 35, and the plate 31, in conjunction with the blocks 32 substantially surround the feeder zone 40 of the member 35 and provide a medium for effectively preventing heat loss from the molten material or glass in the feeder zone 40.

The side walls 48 are provided with laterally extending flanges 50 which extend between the plate 31 and the blocks 32, and the upper end regions of the walls 48 and end walls 49 are formed with lateral flanges 52 which engage the upper surfaces of the blocks 32 in the manner illustrated in FIGURE 5. The flanges 50 and 52 engaging respectively the plate 31 and the blocks 32 serve to support the member or receptacle 35.

Supported upon the blocks 32 is a pair of blocks or members 54 extending longitudinally of the receptacle 35 and a second pair of blocks 56 is disposed transversely of the blocks 54 and form therewith a rectangularly-shaped compartment or region 58 which accommodates the material melting portion of the receptacle 35. If desired, the blocks 54 and 56 may be integrated or molded into a single member of refractory.

The members 54 and 56 provide a means for preventing heat loss in transverse directions from the melting region 39. A plate or member 60 preferably of refractory is supported by the blocks 54 and 56 forming a ceiling or cover for the space 58.

The melting region of the member 35 is defined by side walls 62 and end walls 64, the side walls and end walls diverging outwardly and are provided with flanges which mate with and are welded or otherwise joined to the flanges 52. The upper termini of the side walls 62 and end walls 64 are formed with horizontally disposed flanges 66 which engage the lower surface of the cover plate 60 in the manner illustrated in FIGURES 4 and 5.

Supported upon the members 24 and 26 of the frame construction 10 is a hopper or receptacle 70 adapted to contain a supply of heat-softenable material such as glass preferably in the form of glass cullet, bodies or marbles 72. The upper region of the hopper 70 is of substantially rectangular cross-section as particularly shown in FIGURE 3 and is joined with a portion 74 of reduced cross-sectional area by convergingly arranged walls 76.

Extending beneath the portion 74 of the hopper is a cage-like configuration 80, the side walls 82 of the cage being formed as continuations of the side walls of portions 74 of the hopper. Secured to the lower end region of each of the walls 84 of the hopper portion 74 is a group of transversely spaced rods or bars 86, the groups of bars being generally convergent as shown in FIGURES 1 and 4 and defining with the walls 82 a marble discharge port or region 86.

The discharge region 86 from the hopper construction is in registration with a substantially rectangularly-shaped passage or opening 88 provided in a collar or member 90, the passage 88 being defined by a depending sleeve portion 92 extending through an opening in the plate 60. Laterally extending flange portions 94 formed on member 90 engage the plate 60 to properly position the collar 90. The glass cullet or marbles 72 from the hopper move through the passage 88 into the melting zone 39.

The bars 86 for guiding the marbles 72 into the melting region 39 are disposed so that the widths of the spaces between adjacent bars are less than the diameters of the marbles to prevent the passage of the marbles through the spaces. Extending transversely across the hopper 74 is an element or baffle 96 to prevent the marbles "bridging" across the hopper and impeding movement of the marbles into the melting region 39. It is to be understood that other forms of baffle means may be utilized to accomplish this purpose.

The method and apparatus of the invention are especially usable for processing heat-softenable mineral materials such as glass to form streams of the glass from which filaments, fibers, or other linear bodies may be attenuated. As highly fined or refined glass is necessary for forming filaments suitable for textiles, the glass batch is melted, fined and refined in a large furnace to a high degree of homogeniety. The refined glass is then preformed into the marbles which are delivered into the hopper 70 and processed according to the method of the invention as hereinafter described.

A novel feature of the invention resides in an apparatus for performing steps in the method of the invention of reducing the glass cullet or marbles 72 to a molten or flowable condition in the melting region or compartment 39 of the receptacle 35 and maintaining the molten or flowable glass in the feeder region 40 of the member 35 in proper condition or viscosity for flowing streams 46 of uniform character from the orifices in the projections 44.

The end walls 49 are provided respectively with terminals 98 which are integrally formed with or welded to the end walls. The current conductors for supplying heating current to the receptable or chamber 35 are provided with connectors 100 of conventional character having portions which straddle the terminals 98 drawn into intimate contact with the terminals by means of clamping bolts 102 extending through openings formed in the connectors.

The current supplied to the chamber 35 for generating heat is of low voltage and high amperage. It will be noted from FIGURE 4 that the connectors 100 are of a width less than the length of the terminal portions 98 whereby the connectors may be adjusted in a vertical direction to change the region of current flow into the terminals for varying the distribution of current through components of the receptacle 35 for purposes hereinafter explained.

It is imperative to establish a highly heated region for the molten material adjacent the orifice tips 44 in order to maintain the glass at low viscosity to provide streams of uniform characeristics through all of the orifices in the floor 42 of the feeder 40. To better accomplish this result, it is desirable to employ a shunt associated with each of the terminals 98 to facilitate current flow through the floor 42 of the receptacle.

Each terminal 98 is inclusive of a triangularly shaped portion 104 shown in FIGURES 4 and 6 which is thicker than the terminal 98 to facilitate current flow through the walls of the feeder section 40. There is provided a current conducting shunt member 106 which has its lower end welded as at 107 to the lower region of an end wall 49 of the receptacle 35. The upper region of the member 106 is slotted providing portions 108 which straddle the triangularly shaped member 104 as illustrated in FIGURES 5 and 6 and are welded to the member 104.

The shunt members 106 facilitate increased current flow from the terminal 98 through the floor 42 with a minimum of resistance of the current path from the terminals 98 to the floor. Through this arrangement the current flow through the floor 42 heats the molten material immediately above and adjacent the floor to a higher temperature than the molten material further removed from the floor. By elevating the temperature of the molten glass adjacent the floor, the viscosity of the glass is lowered for flowing the streams 46 from the feeder region 40.

The configuration of the partition or heater strip 37 and its relative position separating the melting zone 39 and the feeder zone 40 is an important factor in effecting or attaining automatic control or regulation of the glass level or head of molten glass in the feeder 40 without the use of level control devices or mechanical marble gating or metering devices.

As shown in FIGURES 4, 5 and 7, the partition, screen or heater strip 37 is of V-shaped cross-section, the central apex region 110 being disposed to be immersed in the molten glass in the feeder section or zone 40, the V-shaped configuration extending full length of the receptacle 35. The partition 37 is provided with orifice means or openings to facilitate the flow or transfer of flowable glass above the partition into the feeder region 40. The orifices are formed by shearing the metal of the partition and bending or distorting sheared portions away from the planar surfaces of the partition.

It is essential that the metal remain in a position whereby it provides a direct metallic path for flow of electric current lengthwise of the partition 37 in order to avoid any appreciable obstruction to the current flow which would impair the heating efficiency. In the preferred form of orifice arrangement illustrated in the drawings, a plurality of rows of longitudinally spaced slits 114 are sheared in the partition or strip 37 as shown at 114.

The metal 116 adjacent each of the slits and at one side thereof is bent, distorted or struck downwardly to form a curved portion defining an orifice 118. It will be apparent from FIGURE 7 that the curved regions 116 of metal formed from the plate provide bridges or metallic paths extending generally lengthwise of the partition to facilitate current flow adjacent each orifice.

Each curved portion 116 is of a louver-like shape and the central portion of each louver is preferably horizontally disposed to form a relatively short recess or channel adjacent each orifice through which the molten glass above the partition may flow into the region below the partition. The apex region 110 is provided with longitudinally spaced relatively small orifices or regions 122 to prevent pocketing of molten glass in the V-shaped central zone above the partition 37.

Venting means is provided to facilitate the escape and conveyance of volatiles or gases which emanate from the molten glass in the feeder chamber or region 40. In the embodiment illustrated, two vent tubes or passages 124 and 125 are arranged at diagonally opposed corner regions at the upper zone of the feeder chamber 40 as particularly shown in FIGURES 6 and 7. As shown in FIGURE 7, the tube 124 extends through an opening in the partition 37 so as to vent one of the spaces 127 which is above the level of the glass in the feeder region 40 while the tube 125 vents the other passage or space adjacent the partition 37.

The vent tubes extend upwardly through the space 58 defined by the blocks 54 and 56 and through openings provided in the cover plate 60. This arrangement is advantageous in that the glass in the feeder region is of a temperature at which volatiles are driven off of the glass and hence the glass is additionally refined during its movement downwardly through the feeder.

The arrangement disclosed for carrying out the method of the invention performs many novel functions and secures various advantageous and novel results over prior methods of melting and conditioning molten glass for processing into linear bodies or filaments.

One of the major novel features resides in controlling automatically the delivery of molten glass into a feeder whereby the head of glass in the feeder is maintained substantially constant so that streams having uniform characteristics are continuously discharged from the orifices in the floor 42 and the feeder region continuously replenished with molten glass without any marble gating means or liquid level control devices.

In the operation of the arrangement disclosed in the drawings and described herein, a current of high amperage and low voltage is flowed through the receptacle or member 35 through current supply conductors connected with the terminals 98. It should be noted that the terminals 98 are adjacent to the partition 37. Through this arrangement substantial current flow is had between the terminals through the partition or heater strip 37.

Without the shunt arrangement 106, some of the current will flow through the floor 42 of the receptacle 35 to slightly decrease the viscosity of the glass adjacent the floor. However, with the shunt means 106 connected with the terminals 98, sufficient current is biased through the feeder floor 42 so as to substantially raise the temperature of the molten glass adjacent the floor, thereby to lower its viscosity so that the streams of glass are highly fluid, a condition which minimizes freezing or congealing of the glass adjacent the discharge orifices and providing more uniform streams of glass.

By changing the region of contact of the connectors 100 with the terminals 98, a measure of control of the division of current flow through the heater strip 37 and the floor 42 may be had. Thus, if more heat is desired adjacent the heater strip 37, the couplings or connectors 100 are adjusted to a higher position on the terminals to provide a metal path for the current more nearly in alignment with the heater strip 37, and if more current is desired in the floor 42 to deliver increased heat to the molten material adjacent the floor, the connectors 100 are lowered on the terminals 98.

The solid marbles 72 contained in the hopper 74 move downwardly by gravity at a rate at which they are melted in the melting zone 39 by the heat generated through the flow of current through the heater strip 37 and the adjacent wall regions of the member 35. The level of the glass indicated at 130 in FIGURE 5 in the feeder zone 40 is automatically maintained substantially constant by reason of the change in direction of the heat transfer from the heating strip into the molten glass or material at opposite sides of the strip.

In the surface areas of the heater strip 37 in direct contact with the molten glass, heat transfer is effected by conduction and, to a lesser extent, by radiation from the surface of the strip. In surface regions of the strip 37 which are not in direct contact with the molten glass, heat transfer is effected only by radiation which is much less effective than by conduction.

A normal or predetermined level of glass, such as the level indicated at 130, is established and maintained as follows: As streams of glass are withdrawn from the orifices in the tips 44, the level 130 of the molten glass in the feeder 40 tends to fall. When this occurs, there is less area of the lower surface of the strip 37 in actual contact with molten glass in the feeder 40 and hence a lesser amount of heat is transferred to the glass below the partition by conduction.

This action automatically diverts more of the heat generated by current flow through the strip 37 to the glass above the strip and hence the melting rate of the marbles is increased. Furthermore the molten glass above the strip 37 is elevated in temperature, and its viscosity therefore proportionately decreased. Through this shift in the direction of heat transfer from the strip 37, the glass adjacent and above the strip 37 becomes more fluid and flow through the orifices 118 in the strip 37 into the feeder chamber 40 is increased, thus raising the level of the glass in the feeder 40.

As the glass level in the feeder approaches its normal level, more area of the lower surface of the strip 37 is contacted by the molten glass below the strip, causing more heat to be transferred by conduction to the glass below the strip with a lesser amount of heat transferred to the glass above the strip. Thus, by automtaically restricting or decreasing the heat flow from the strip 37 to the glass above the strip, its viscosity is raised and the melting rate reduced.

The more viscous glass does not readily flow through the orifices 118 so that the level of the glass in the feeder 40 does not rise appreciatively above its standard level indicated at 130. If withdrawal of the glass from the orifices 44 in the tips 46 tends to reduce the level of glass in the feeder chamber 40, the cycle of changes in direction of heat transfer into the glass is repeated whereby to maintain a substantially constant level in the feeder section.

If the glass level indicated at 130 tends to rise by reason of a reduced rate of withdrawal of the glass from the feeder 40, the area of contact of the glass with the lower surface of strip 37 is increased and proportionately more heat is transferred to the glass in the feeder and less heat is transferred to the melting zone 39 with a consequent decrease in the melting rate and an increase in the viscosity of the glass above the strip.

This condition reduces the flow of the glass through the orifices in the strip until the glass level recedes to its proper height through the attainment of a balance of heat distribution to the glass above and below the strip 37.

The heater strip or partition 37 is preferably of V-shaped cross-section so that the apex region thereof extends below the level of the glass in the feeder zone as shown in FIGURE 5, and the angularity of the planar portions forming the V-shape is such that the apex region is immersed even though there are minor deviations in the predetermined level of glass in the feeder, which deviations may occur as above described in the automatic maintenance of a substantially constant level by a shift in the direction of transfer of heat from the strip to the glass above and below the strip.

It is to be understood that while a V-shaped cross-sectional configuration for the heater strip is desired, other cross-sectional configurations of strip may be employed for performing substantially the same functions. For example, the heater strip may be of flat or planar character and angularly disposed in a transverse direction with respect to a horizontal plane whereby the lower edge region of the strip is normally immersed in the glass below the strip. The perforated strip may also be formed of curved configuration or trough-like shape or the strip may be of polygonal shape in cross-section and arranged whereby a portion of the strip is normally beneath the level of the glass in the feeder section or zone.

The position of the venting means or ports for conveying away volatiles from the glass in the feeder section is an essential feature as it enables a further refining of the glass in the feeder section prior to the delivery of the glass from the feeder through the orifices in the tips 44. Only a small amount of volatiles emanate from the molten glass above the heater strip because the surface region of the molten glass is quite viscous at the zone of transition of the solid marbles into a flowable glass which forms a skin layer which is not easily penetrated by the volatiles.

The size of the orifices in the screen or partition 37 has a bearing upon the difference in levels of glass maintained in the premelter zone and the feeder zone, for the reason that a glass of a particular viscosity may flow through larger area openings at a definite rate while glass of the same viscosity may flow through orifices of smaller area at a greatly reduced rate.

The bulk of marbles in the hopper and at the region of entry into the melting zone have several distinct advantages. The marbles moving downwardly into the melter are heated to progressively increasing temperatures as they move toward the melting region in the premelter and at the time that they reach the molten glass in the premelter they are at a comparatively high temperature so that their entry into the molten glass does not impart a thermal shock to the molten glass in the melting chamber as they are in a gradual stage of transition to a molten condition. Furthermore, the bulk of marbles above the premelter provide an insulator to prevent the waste of heat rising from the premelter, as such heat is transferred to the body of marbles by radiation and reflection and thus advantageously utilized for preheating the marbles.

The following is a characteristic example of operating conditions for successful functioning of the apparatus and method, partition size and configuration, orifice areas and approximate temperatures of the glass in its traverse from the solid marble stage through the chamber 37 in the melting zone and the feeder zone and its temperature at the region of discharge through the orifices in the tips 44: In an arrangement wherein the chamber 35 is approximately twelve inches in length and three and one-half inches in width at the juncture of the partition 37 with the walls 38, the converging planar portions of the partition 37 are of an approximate angle of thirty degrees with respect to a horizontal plane.

There are ninety-four orifices 118 formed in the heater strip 37 arranged in six rows, three at each side of the apex thereof, the rows being spaced about one-half inch and a summation of the areas of the orifices 118 is about one square inch, the orifices of the middle row of each group being staggered with respect to the adjacent rows as illustrated in FIGURE 4. There are eight orifices 122 at the apex of the partition of comparatively small size, being about one-sixteenth of an inch in diameter and are for the purpose of preventing isolation of glass at the apex.

The marbles in the hopper 74 and at the entrance region of the melting zone 39 are progressively heated whereby the marbles at the zone of transition to a softened or flowable state may be elevated to a temperature upwards of 1500° F. or more. Sufficient current is supplied through the partition or screen 37 whereby the temperature of the partition is maintained at approximately 2700° F. in the described example of operating conditions. It is to be understood that if glass is to be melted and processed at a higher flow rate, the temperature of the partition 37 may be proportionately increased by increasing the current supplied thereto.

In the instant example, the heat-softened or molten glass in the premelter zone 39 is progressively increased or elevated in temperature as it moves downwardly toward the feeder strip or partition 37 and, at the region of contact with the strip 37 may be at a temperature of approximately 2200° F. or more. The region of the glass in the feeder zone adjacent the level 130 thereof may be heated by the strip to approximately 2500° F. or more which is the zone of highest glass temperature in the traverse of the glass through the receptacle 35.

This region of glass is of the highest temperature by reason of the concentration of current flow through the heater strip or partition. As the glass moves downwardly through the zone 40, the temperature progressively decreases until it approaches a region spaced slightly above the floor 42 at which the glass may be of a temperature of approximately 2200° F. As substantial electric current flows through the floor 42 by reason of the shunt 106, the temperature of the glass adjacent the floor is increased to 2250° F. or more, effecting a decrease in the viscosity increasing its fluidity. Thus the glass discharged is highly fluid and the streams 46 are therefore of uniform size and characteristics.

It is to be understood that the foregoing example is illustrative of operating conditions which have been found to produce excellent results, and the sizes of the components and operating temperatures may be varied dependent upon the composition of the glass and the number and size of the streams discharged from the feeder.

The streams 46 may be formed into fine filaments 135 by attenuation or utilized for other purposes. In the formation of filaments, the filaments 135 from the streams are gathered into a strand or sliver 137 by a gathering means or eye 138, the strand or sliver being wound onto a spool or sleeve carried by a mandrel 140 to form a package. The mandrel is rotated by means (not shown) at speeds to attenuate the filaments at upwards of 10000 or more feet per minute. A suitable traverse 142 of conventional character is employed to distribute the strand lengthwise of the collecting sleeve.

In order to form fine filaments of substantially uniform size and characteristics, the viscosity of the glass must be held within a comparatively narrow range. While it is essential in the formation of uniform streams to maintain the glass at the region of discharge in a highly fluid condition, the viscosity may be too low to satisfactorily attenuate the streams to filaments. In order to raise the viscosity of the streams a cooling means may be employed which is disposed just below the floor of the feeder 40.

As particularly shown in FIGURES 4 and 5, a tubular member or manifold 145 is disposed longitudinally of and in parallelism with the receptacle 35 which is mounted upon a support 147. Pipes or tubes 148 and 149 are connected with the ends of the tubular member 145 for conveying a cooling or temperature controlling fluid such as water through the member 145. Secured to the tubular member 145 are transversely extending fins or projections 150 spaced lengthwise whereby each pair of fins straddle two transverse rows of the streams 46 as shown in FIGURE 4 in position for effectively transferring heat from the streams to the cooling medium to raise the viscosity of glass of the streams for most efficient attenuation. By regulating the rate of flow and temperature of the cooling fluid in the manifold 145, the viscosity of the glass at the region of attenuation may be maintained within the desired range.

It is apparent that, within the scope of the invention, modifications and different arrangements may be made other than is herein disclosed, and the present disclosure is illustrative merely, the invention comprehending all variations thereof.

I claim:
1. A method of processing heat-softenable mineral material including maintaining a supply of bodies of heat-softenable mineral material, feeding the bodies by gravity from the supply into a walled melting chamber, melting the bodies in the chamber, flowing the molten mate- rial into a feeder formed with orifices, flowing electric energy concomitantly through the chamber and feeder for heating the material in the chamber and feeder, adjusting the point of application of the electric energy to the chamber and feeder for establishing differential viscosities of the molten material in the chamber and that in a lower region of the feeder, and flowing streams of the molten material from the lower region of the feeder through the orifices.

2. Apparatus of the character disclosed, in combination, a metal-walled chamber adapted to reduce pieces of heat-softenable mineral material to a molten state, a hopper disposed above the melting chamber containing a bulk supply of the pieces of material whereby the supply is supported by the chamber, a metal-walled feeder chamber, a perforated V-shaped metal partition between said chambers whereby molten material in said melting chamber flows into the feeder chamber, orifice means in a wall of the feeder chamber through which the molten material is discharged therefrom, means for applying electric energy to the melting chamber, feeder chamber and partition to melt the pieces of material in the melting chamber and maintain the material in the feeder chamber in flowable condition, and means for adjusting the point of application of electrical energy to the chambers to regulate the distribution of heat in said chambers.

3. Apparatus for processing heat-softenable material including, in combination, a metal-walled chamber having orifices formed in a bottom wall thereof through which heat-softened material is delivered in streams, a metal partition in said chamber dividing the chamber into a melting compartment and a feeder compartment, a hopper adapted to contain a bulk supply a pieces of heat-softenable mineral material whereby the supply pieces are supported by the material in the melting compartment, said partition being formed with struck up curved portions defining trough-like passages through which molten material flows from the melting compartment into the feeder compartment, said partition having a V-shaped portion extending into the molten material in the feeder compartment, means for flowing electric current through the partition for heating the partition to transfer heat to the material at each side thereof, said struck up portions being disposed to provide metallic paths at the regions of the passages in the direction of current flow through the partition.

4. A method of processing heat-softenable mineral material, including maintaining a supply of bodies of the material, delivering the bodies by gravity into a melting compartment, transferring the molten material through a perforated member into a feeder compartment, flowing electric current through the member to produce heat for reducing the bodies in the melting compartment to a flowable state and maintain the material in the feeder compartment in a flowable state, and modifying the viscosity of the material in the melting compartment by varying the heat transferred from the perforated member to the material in the melting compartment in proportion to the area of contact of the material in the feeder compartment with the perforated member.

5. The method of processing heat-softenable mineral material including maintaining a bulk supply of solid pieces of mineral material supported by material in a first compartment, flowing molten material from the first compartment through a perforated surface into a second compartment, applying electric current to the surface for melting the pieces of mineral material in the first compartment and maintaining the material in the second compartment in a flowable state, the perforated surface being partially immersed in the material in the second compartment, discharging streams of the molten material from the second compartment, and varying the heat transferred to the material in the first compartment from the perforated surface for controlling the melting rate and viscosity of the material in the first compartment to automatically regulate the rate of flow of molten material from the first compartment into the second compartment.

6. The method of processing heat-softenable mineral material including maintaining a bulk supply of solid pieces of mineral material supported by material in a first compartment, flowing molten material from the first compartment through a perforated surface into a second compartment, applying electric current to the perforated surface for melting the pieces of mineral material in the first compartment and maintaining the material in a flowable state in the second compartment, said perforated surface being partially immersed in the material in the second compartment, discharging streams of the molten material from the second compartment, varying the heat transferred to the material in the first compartment from the perforated surface for controlling the melting rate and viscosity of the material in the first compartment to automatically regulate the rate of flow of molten material from the first compartment into the second compartment, and venting the second compartment to convey away volatiles emanating from the molten material in the second compartment.

7. A method of processing heat-softenable glass including maintaining a supply of spherically-shaped glass bodies in a hopper, advancing the bodies into a melting compartment, flowing molten glass from the melting compartment to a feeder in communication with the melting compartment through passages in a partition disposed between the compartment and feeder, flowing electric current through the melting compartment, partition and feeder to reduce the bodies in the melting compartment to a flowable state and maintain the glass in the feeder in a flowable state, progressively preheating the spherically-shaped bodies in the hopper by heat from the melting compartment as the bodies of the supply advance toward the melting compartment to reduce thermal shock, flowing streams of the material from the feeder, adjusting the region of application of electric current to the melting compartment and feeder to regulate the distribution of current in the melting compartment and feeder, transferring heat from the partition to the glass in contact with the partition in the melting compartment in proportion to the area of contact of the molten glass in the feeder with the partition to vary the viscosity of the molten glass in the melting compartment, and venting gases emanating from the molten glass in the feeder independently of the melting compartment.

8. Apparatus for processing heat-softenable mineral material including, in combination, a metal chamber having orifices formed in a wall thereof through which streams of heat-softened material are delivered, a metal partition extending across the chamber and having a downwardly extending portion, said metal partition providing a melting compartment and a feeder compartment, means adapted to contain a supply of pieces of heat-softenable mineral material disposed above the melting compartment for delivery of the material into the melting compartment, the downwardly extending portion of said partition being formed with struck up projections defining trough-like passages through which the molten material flows from the melting compartment into the feeder compartment, the depressed portion of said partition extending into the molten material in the feeder compartment, means for flowing electric current through the walls of the chamber for heating the material in the melting compartment and the feeder compartment, said struck up portions being arranged to provide metallic paths for the electric current in the regions of the passages in the direction of current flow through the partition.

9. Apparatus for processing heat-softenable material including, in combination, a metal walled receptacle, a metal partition member extending transversely across the receptacle to provide a melting chamber and a feeder chamber in the receptacle, means for supplying bodies of heat-softenable material to the melting chamber, said partition member having an angularly disposed portion, said angularly disposed portion being formed with struck up projections forming trough-like passages arranged in different horizontal planes through which the molten material flows from the melting chamber into the feeder chamber, the bottom wall of the receptacle defining the bottom of the feeder chamber being formed with a plurality of material discharge orifices through which flow streams of the material, means for flowing electric current through the metal partition member for heating the partition to transfer heat to the material at each side thereof, said struck up portions being disposed to provide metallic paths for the electric current at the region of the passages in the direction of current flow through the partition.

10. Apparatus for processing heat-softenable mineral material including, in combination, a metal chamber having orifices formed in the bottom wall thereof through which streams of heat-softened material are delivered, a metal partition extending across the chamber and having a downwardly extending portion, said metal partition providing a melting compartment and a feeder compartment in the metal chamber, means adapted to contain a supply of pieces of heat-softenable mineral material disposed above the melting compartment for delivery of the material into the melting compartment, said partition being formed with struck up portions defining trough-like passages through which the molten material flows from the melting compartment into the feeder compartment, the downwardly extending portion of said partition extending into the molten material in the feeder compartment, means for flowing electric current through the partition for heating the material in the melting compartment and the feeder compartment, said struck up portions being arranged to provide metallic paths for the electric current in the regions of the passages in the direction of current flow through the partition, and means for shunting electric current through the bottom wall of the feeder chamber to reduce the viscosity of the molten material adjacent the material discharge orifices.

11. A system for establishing automatic control of the level of molten glass in a metal feeder from which the molten glass is continuously withdrawn, a metal walled melting compartment connected with the metal feeder, a metal partition between the metal feeder and the melting compartment, said metal partition being of nonplanar shape, said partition being formed with struck up curved portions defining trough-like passages through which molten material flows from the melting compartment into the feeder, means for flowing electric current through the metal partition to transfer heat to the glass above and below the partition, a hopper disposed above the melting compartment arranged to contain a supply of pieces of glass supported by the glass in the melting compartment whereby the pieces of glass are heated by heat from the melting compartment as the pieces advance toward the melting compartment, the direction and magnitude of transfer of heat from the partition to the molten glass above and below the partition being proportional to the areas of contact of the molten glass with the upper and lower surfaces of the partition whereby to vary the transfer of heat to the glass in the melting compartment and modify its viscosity to thereby regulate automatically the rate of melting of the glass in the melting compartment and the rate of flow of molten glass through the trough-like passages in the partition into the feeder.

References Cited in the file of this patent

UNITED STATES PATENTS

| | | |
|---|---|---|
| 1,954,732 | Gossler | Apr. 10, 1934 |
| 2,397,852 | Gentil | Apr. 2, 1946 |
| 2,465,283 | Schlehr | Mar. 22, 1949 |
| 2,485,851 | Stevens | Oct. 25, 1949 |
| 2,618,906 | Hess | Nov. 25, 1952 |
| 2,692,296 | De Piolenc et al. | Oct. 19, 1954 |

FOREIGN PATENTS

| | | |
|---|---|---|
| 1,008,738 | France | May 21, 1952 |
| 78,183 | Netherland | June 15, 1955 |